US012786184B1

(12) United States Patent
Royal et al.

(10) Patent No.: US 12,786,184 B1
(45) **Date of Patent: *Nov. 3, 2026**

(54) ACCESS CONTROL OF EXTERNAL CAPABILITIES EXPOSED BY A RESOURCE SERVER FOR ARTIFICIAL INTELLIGENCE MODELS

(71) Applicant: CLOUDFLARE, INC., San Francisco, CA (US)

(72) Inventors: James Howard Royal, Austin, TX (US); Jesse Li, New York, NY (US); Kenneth A. Johnson, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/403,943

(22) Filed: Nov. 30, 2025

Related U.S. Application Data

(63) Continuation of application No. 19/286,205, filed on Jul. 30, 2025, now Pat. No. 12,513,139.

(51) Int. Cl.
*H04L 9/40* (2022.01)

(52) U.S. Cl.
CPC ............ *H04L 63/083* (2013.01); *H04L 63/10* (2013.01)

(58) Field of Classification Search
None
See application file for complete search history.

(56) References Cited

U.S. PATENT DOCUMENTS 6,308,266 B1 * 10/2001 Freeman ............... G06F 21/121 713/172
11,805,127 B1 * 10/2023 Sundar .................. H04L 63/102
12,452,247 B1 * 10/2025 Pavnoji ................. H04L 63/102
12,549,574 B1 * 2/2026 Morgan .............. H04L 63/1416
2008/0072301 A1 * 3/2008 Chia .................. H04L 63/0815 726/8
2012/0144501 A1 * 6/2012 Vangpat ................ H04L 63/108 726/28
2013/0191884 A1 * 7/2013 Leicher ................... H04L 63/08 726/4
2014/0373099 A1 * 12/2014 Durbha ................... H04L 63/10 726/4
2015/0312257 A1 * 10/2015 Antipa .................... H04L 63/10 709/225
2016/0381021 A1 * 12/2016 Moore .................. H04L 63/102 726/1
2017/0034172 A1 * 2/2017 Biggs ...................... H04L 63/08

(Continued)

*Primary Examiner* — Michael Pyzocha
(74) *Attorney, Agent, or Firm* — NICHOLSON DE VOS WEBSTER & ELLIOTT LLP

(57) ABSTRACT

Controlling access to external capabilities exposed by a resource server for artificial intelligence models. An access server receives an authorization request from a resource client for authorization of a resource server. The access server determines a set of capabilities associated with the resource server and enforces access policies to identify permitted capabilities subject to consent being given. After determining that consent has been given, the access server generates an access token that is capable of being used as a credential for the consented capabilities. Subsequent requests from the resource server are validated and routed to the appropriate capabilities, with responses returned accordingly.

20 Claims, 7 Drawing Sheets

(56) References Cited

U.S. PATENT DOCUMENTS

| | | | | |
|---|---|---|---|---|
| 2018/0191701 | A1* | 7/2018 | Kong | H04L 67/14 |
| 2019/0075108 | A1* | 3/2019 | Clarke | H04L 9/3234 |
| 2019/0312857 | A1* | 10/2019 | Lander | H04L 9/3271 |
| 2020/0160329 | A1* | 5/2020 | Beck | G06Q 20/355 |
| 2021/0136076 | A1* | 5/2021 | Barhudarian | H04L 63/08 |
| 2021/0218742 | A1* | 7/2021 | Cook | H04L 63/102 |
| 2023/0239151 | A1* | 7/2023 | Madden | H04L 63/10<br>713/185 |
| 2023/0421474 | A1* | 12/2023 | Olden | H04L 63/08 |
| 2024/0163273 | A1* | 5/2024 | Fabjanski | H04L 63/0823 |
| 2024/0223551 | A1* | 7/2024 | Suraparaju | H04L 63/0815 |
| 2024/0338471 | A1* | 10/2024 | Agrawal | G06F 21/6218 |
| 2024/0340275 | A1* | 10/2024 | Levy | H04L 63/102 |
| 2025/0030677 | A1* | 1/2025 | Marinek | H04L 63/10 |
| 2025/0047489 | A1* | 2/2025 | Shenoy | H04L 9/3213 |
| 2025/0080584 | A1* | 3/2025 | Deshpande | H04L 63/20 |
| 2025/0220044 | A1* | 7/2025 | Jenkins | H04L 63/166 |
| 2025/0247234 | A1* | 7/2025 | Garrepalli | H04L 9/3213 |
| 2025/0247381 | A1* | 7/2025 | Ponnuswamy | H04L 63/0815 |
| 2025/0260690 | A1* | 8/2025 | Oichman | H04L 63/0807 |

* cited by examiner

ACCESS CONTROL OF EXTERNAL CAPABILITIES EXPOSED BY A RESOURCE SERVER FOR ARTIFICIAL INTELLIGENCE MODELS

CROSS-REFERENCE TO RELATED APPLICATIONS

This application is a continuation of U.S. application Ser. No. 19/286,205, filed Jul. 30, 2025, which is hereby incorporated by reference.

FIELD

Embodiments of the invention relate to the field of network security; and more specifically, to access control of external capabilities exposed by a resource server for artificial intelligence models.

BACKGROUND

Artificial intelligence (AI) models such as Large Language Models (LLMs) are being integrated into a wide variety of user applications, such as integrated development environments (IDEs), desktop assistants, and enterprise software, to provide intelligent assistance and automate complex tasks.

The Model Context Protocol (MCP) is a protocol that provides a standardized way to connect AI models to different data sources and tools. For example, MCP can be used to build agents and/or complex workflows on top of LLMs. The MCP has a client-server architecture where a host application can connect to one or more servers. An MCP server exposes one or more data sources or tools. An MCP client, which may reside within a host application, communicates with the MCP server using MCP. The MCP server can run locally on the same machine as the MCP client, or can operate remotely from the machine operating the MCP client.

Cloud security service providers may offer an application access enforcer. An application access enforcer is conventionally designed to protect a private application of a customer (e.g., an internal application) from incoming traffic without the need of a VPN. Policies are defined that specify the conditions for accessing the application (e.g., the users that allowed access to the application and under what conditions).

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

An access server enforces access control of external capabilities exposed by a resource server for artificial intelligence (AI) models. The access server is an intermediary between a resource server and the capabilities that the resource server exposes for AI models to a resource client and provides an authentication and authorization layer. The access server only allows the resource server to cause the execution of such capabilities on behalf of the resource client that satisfies any applicable access policies. An authorization framework, such as OAuth, is used to obtain an access token from the access server. The access server enforces access policies for the capabilities(s) associated with the resource server and generates an access token that is only valid as a credential for the capabilities(s) that the user is permitted to use. The resource server uses the access token as a credential to the access server for accessing the permitted capabilities.

Figure 1:
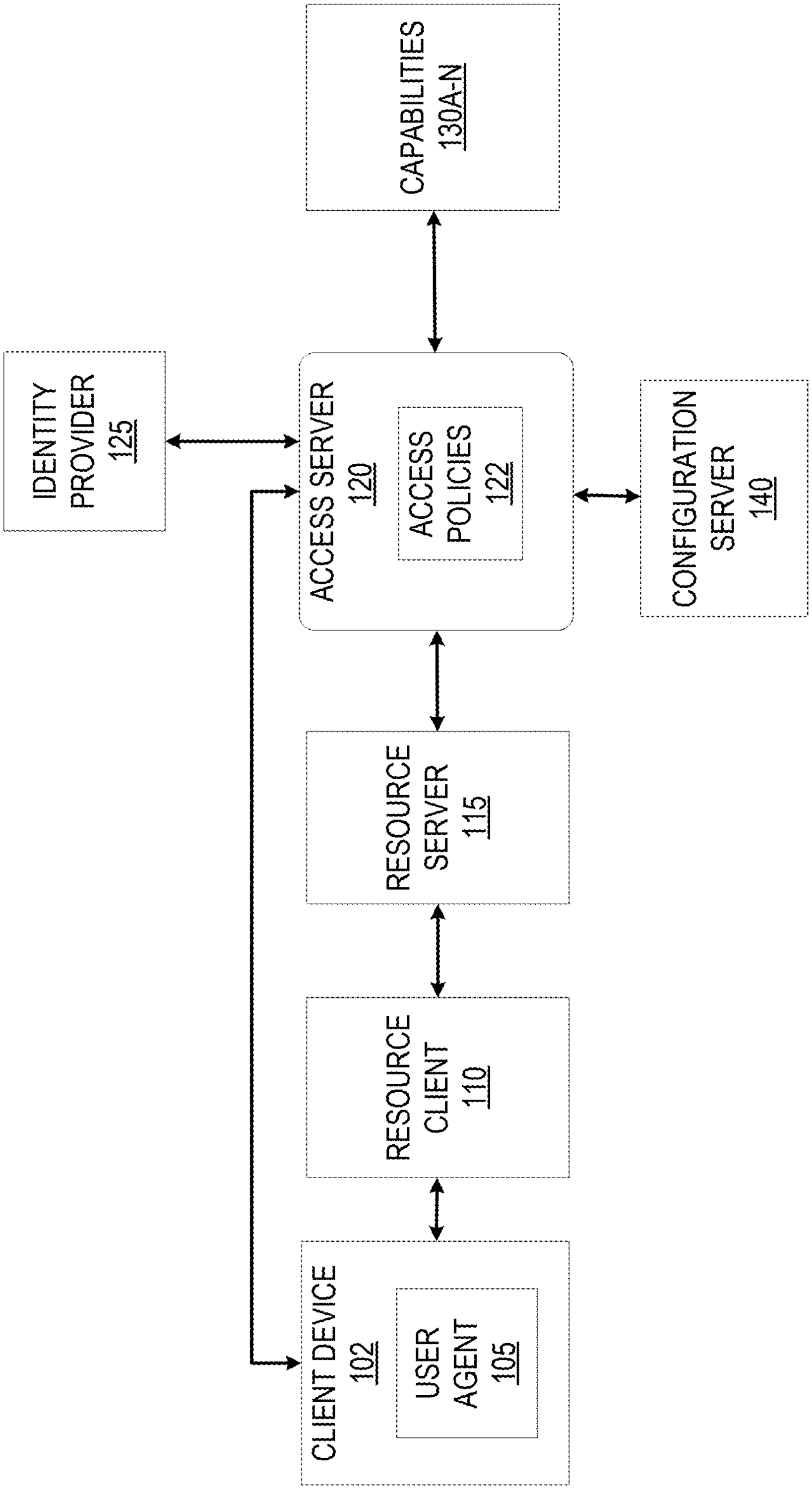
FIG. 1 illustrates an exemplary system for enforcing access control of external capabilities exposed by a resource server for artificial intelligence models, according to an embodiment.

FIG. 1 illustrates an exemplary system for enforcing access control of external capabilities exposed by a resource server for AI models, according to an embodiment. The system includes the resource client 110, the resource server 115, the access server 120, the identity provider 125, the one or more capabilities 130A-N, and the configuration server 140.

The resource client 110 acts as an intermediary between a host application (e.g., a standalone application, a web browser, an AI agent) and one or more resource servers such as the resource server 115. The resource client 110 manages communication between the host application and the resource server(s). The resource client 110 can establish a one-to-one stateful connection with each resource server. Although the resource client 110 can establish communication with multiple resource servers, only a single resource server 115 is shown to not obscure understanding. The resource client 110 sends requests to the resource server 115 based on input from the host application. For example, if the resource server 115 is an email server, the resource client 110 may translate a prompt of "summarize my unread emails" into a request for the resource server 115. The resource client 110 may be an MCP client, and the resource server 115 may be an MCP server, according to the model context protocol.

The client device 102 is a computing device (e.g., laptop, desktop, smartphone, mobile phone, tablet, gaming system, set top box, internet-of-things (IoT) device, wearable device, or other network device) that can transmit and receive network traffic. The client device 102 executes a user agent 105, which can be a web browser or other application that can access network resources.

The resource client 110 can operate on the client device 102. For instance, the resource client 110 may operate on a mobile application, a desktop application, or a browser-based client executing on the client device 102. The resource client 110 can operate on different devices, such as server devices. For instance, the resource client 110 can operate as part of a website or application that interacts with user agents such as the user agent 105.

The resource server 115 can expose one or more remote capabilities for AI model(s) to the resource client 110. A capability is implemented as one or more tools or functions. This allows the resource client to interact with external systems such as databases or performing computation. The resource client 110 can query the resource server 115 for the available capabilities. One or more of these capabilities are protected by the access server 120 such that traffic to the capabilities is only accepted from the access server 120. For example, the capabilities(s) 130A-N are protected by the access server 120. The resource server 115 takes a request from the resource client 110 and translates it into a command that the capability understands. The resource client 110 receives responses from the resource server 115 such as the result of the capability executing, and forwards the response to the resource client 110.

The access server 120 may be part of a cloud-based service that provides a resource capability access service among other services. The access server 120 provides an authentication and authorization layer for the resource server 115 and the one or more capabilities it exposes. The resource server 115 is integrated with the access server 120 such that the access server 120 is the Single Sign-On (SSO) provider. Thus, the access server 120 acts as the identity provider from the perspective of the resource server 115. However, the access server 120 does not verify a user's identity against a user directory; instead it redirects authorization requests to an external identity provider, such as the identity provider 125, to perform that verification. The access server can also enforce one or more access policies to the resource server 115. Requests are only granted access to the resource server 115 if they pass the one or more access policies.

The access server 120 may also provide an authentication and authorization layer to the use of the capabilities 130A-N. For example, one or more access policies can be applied to each of the capabilities 130A-N. The access server 120 exposes only those of the capabilities 130A-N that a particular user has permission to access, based on the one or more access policies applicable to the resource server 115 and/or the capabilities 130A-N.

As described above, the resource server 115 is configured such that the access server 120 is the identity provider from the perspective of the resource server 115. The configuration occurs at the resource server 115 itself and at the access service. The configuration server 140 allows a customer of the resource capability access service to configure the resource server 115 for the access service. For instance, the customer may configure attributes to include in an ID token (e.g., a unique identifier for the user, an email address, a profile, and/or group membership), the redirect URL (or callback URL) that is the endpoint where users are redirected after authenticating, and enabling Proof of Key Exchange (PKCE). The configuration server 140 provides a client secret, a client identifier, a configuration endpoint, an issuer URL, a token endpoint, an authorization endpoint, a key endpoint, and a user info endpoint; which are to be used by the customer for configuring the access server 120 as a SSO provider for the resource server 115.

Although the access server 120 is configured as the identity provider from the perspective of the resource server 115, the access server 120 does not verify a user's identity against a user directory; instead it redirects authorization requests to an external identity provider to perform that verification. In the example of FIG. 1, the identity provider 125 is configured as an identity provider that is integrated with the access server 120 to verify a user's identity. Although a single identity provider is shown, there may be multiple identity providers that interact with the access server 120, which are configurable.

The access server 120 controls access to the one or more capabilities 130A-N. Each capability 130 is configured such that network traffic flows through the access server. The capabilities 130A-N may connect to the access server 120 in multiple ways. For example, an agent may be installed on a server in the network of the capability that creates a secure, outbound only, tunnel to the access server 120. Traffic is only proxied to the capability over the tunnel when initiated by a client to the capability. As another example, a VPN client may be installed on a server in the network of the capability that establishes a connection with the access server 120. As another example, a connector may be installed on a server in the network of the capability that establishes connectivity to the access server 120. This connector acts as a subnet router to relay client-initiated and server-initiated traffic between the devices. As another example, a GRE or IPSec tunnel may be established between a piece of network equipment in the network of the capability and the access server 120.

The configuration server 140 allows a customer to configure a capability for the access service. As part of configuring a capability, the customer can provide a name for the capability, a session duration value that specifies how often a user's application token should expire (e.g., if the traffic is not associated with a valid token, the user will be prompted to reauthenticate with an identity provider), a hostname (which can be a public hostname or a private hostname), a port, and/or an IP address (which can be a publicly routable IP address or a private IP address or private CIDR range). The customer can use the configuration server 140 to associate one or more capabilities 130A-N with the resource server 115, which make those capabilities eligible to be exposed by the resource server 115.

The access server 120 can enforce one or more access policies 122 that are applicable to the resource server 115 and/or the one or more capabilities 130A-N to control access. An access policy includes one or more rules to be evaluated. The one or more rules can be identity-based and/or non-identity based. An identity-based access rule is based on the identity information provided by an identity provider (e.g., username, email address, etc.). For instance, an identity-based access rule may define email addresses or groups of email addresses (e.g., all emails ending in @example.com) that are allowed and/or not allowed. A non-identity based access rule is a rule that is not based on identity. Examples include rules based on location (e.g., geographic region such as the country of origin), device posture, time of request, type of request, IP address, multifactor authentication status, multifactor authentication type, type of device, type of user agent, whether the request is associated with an access agent on the client device, and/or other layer 3, layer 4, and/or layer 7 policies. To determine device posture, for example, the access server 120 may access one or more endpoint protection provider(s) (EPP(s)) to determine the posture of the client device 102. The EPP(s) determine the posture of the client device 102, which can include information such as patch status, management status, vulnerability score, etc. For instance, the EPP can determine if the client device is a healthy device and/or managed correctly as determined by configuration set at the EPP. The EPP(s) transmit a device posture response to the access server 120. The response may indicate whether the client device 102 satisfies their requirements or rules (e.g., whether the client device 102 is healthy and/or compliant). An EPP may be a remote server or in some cases may be an agent that is executing on the client device 102. The configuration server 140 can be used to configure the one or more access policies 122.

The resource server 115 and the capabilities 130A-N may have different access policies with different rules. Thus, it is possible to satisfy an access policy associated with the resource server 115 and violate an access policy associated with a capability 130. Likewise, it is possible for a request to violate an access policy associated with the resource server 115 and satisfy an access policy associated with a capability 130.

An authorization framework, such as OAuth, is used to obtain an access token from the access server 120. The access server 120 enforces the access policies 122 to determine which of the set of capabilities 130A-N, if any, the resource server 115 is permitted to expose to the resource client 110. The access server 120 generates an access token (e.g., an OAuth token) that is only valid as a credential for the set of capabilities 130A-N that the user is permitted to use. The resource server 115 uses the access token as a credential to the access server 120 for accessing the permitted capabilities.

Figure 2A:
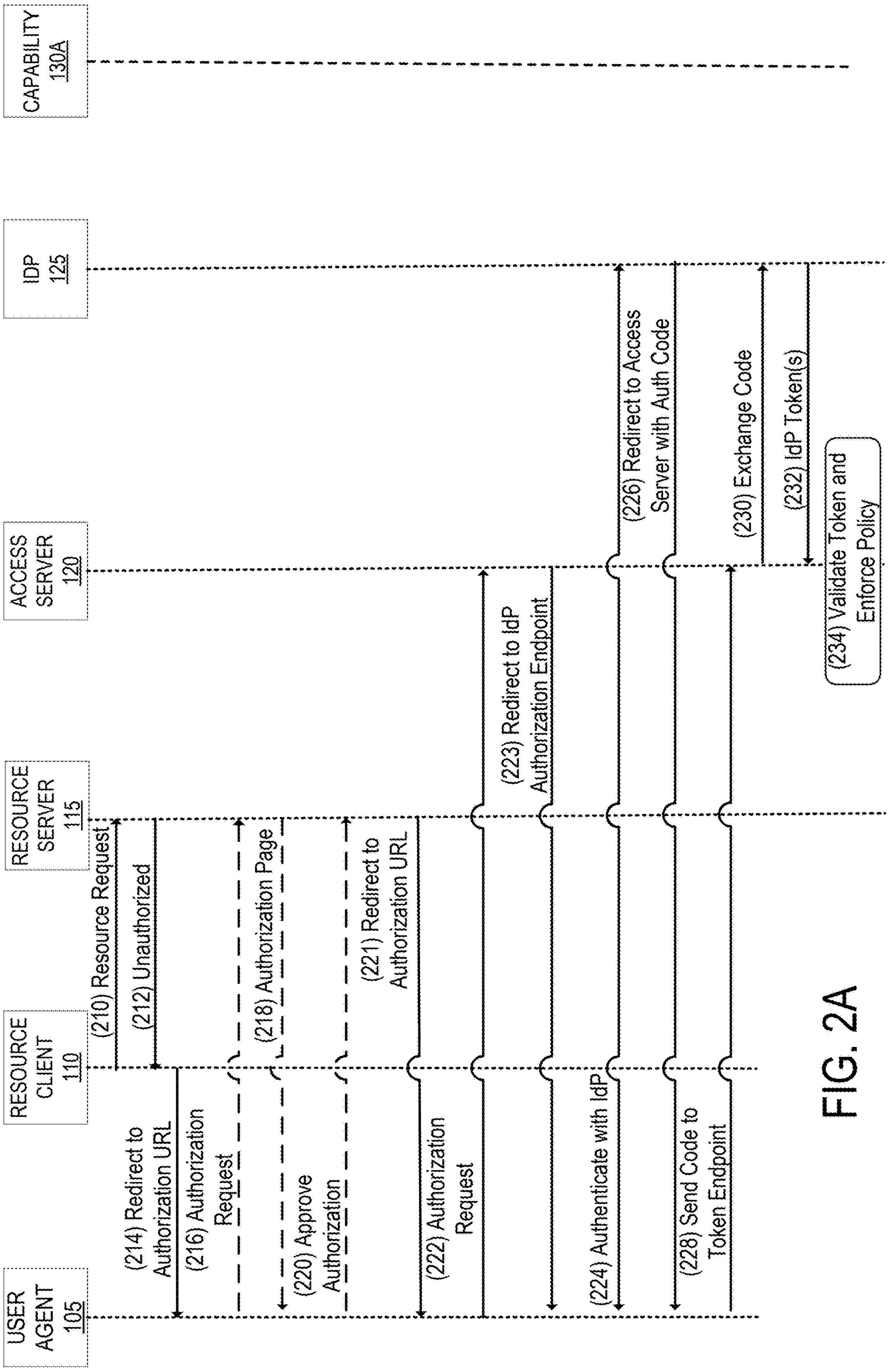
FIG. 2A is a first portion of a sequence diagram that illustrates exemplary operations for controlling access to one or more external capabilities exposed by a resource server for artificial intelligence models according to an embodiment.
Figure 2B:
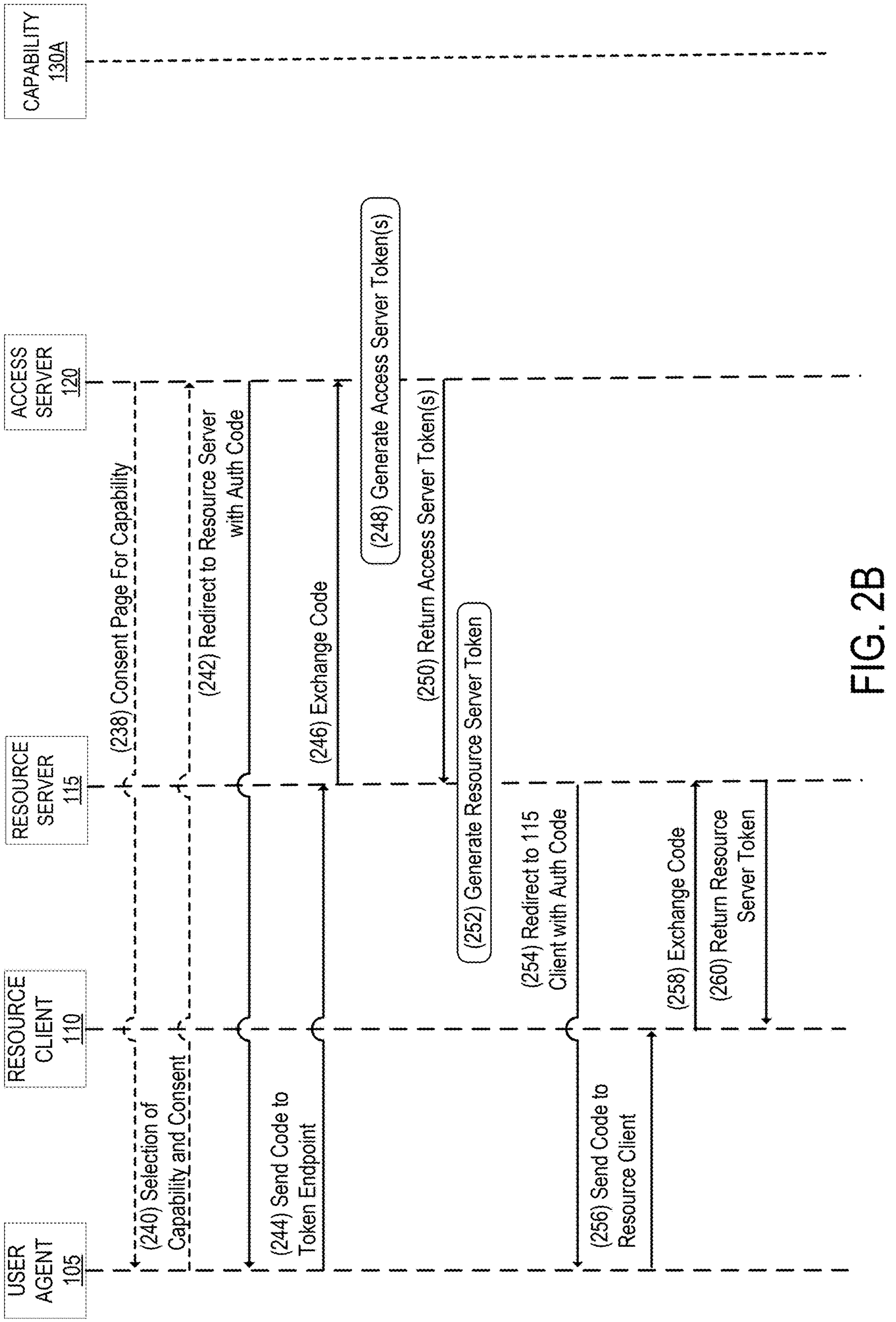
FIG. 2B is a second portion of the sequence diagram that illustrates exemplary operations for controlling access to one or more external capabilities exposed by a resource server for artificial intelligence models according to an embodiment.
Figure 2C:
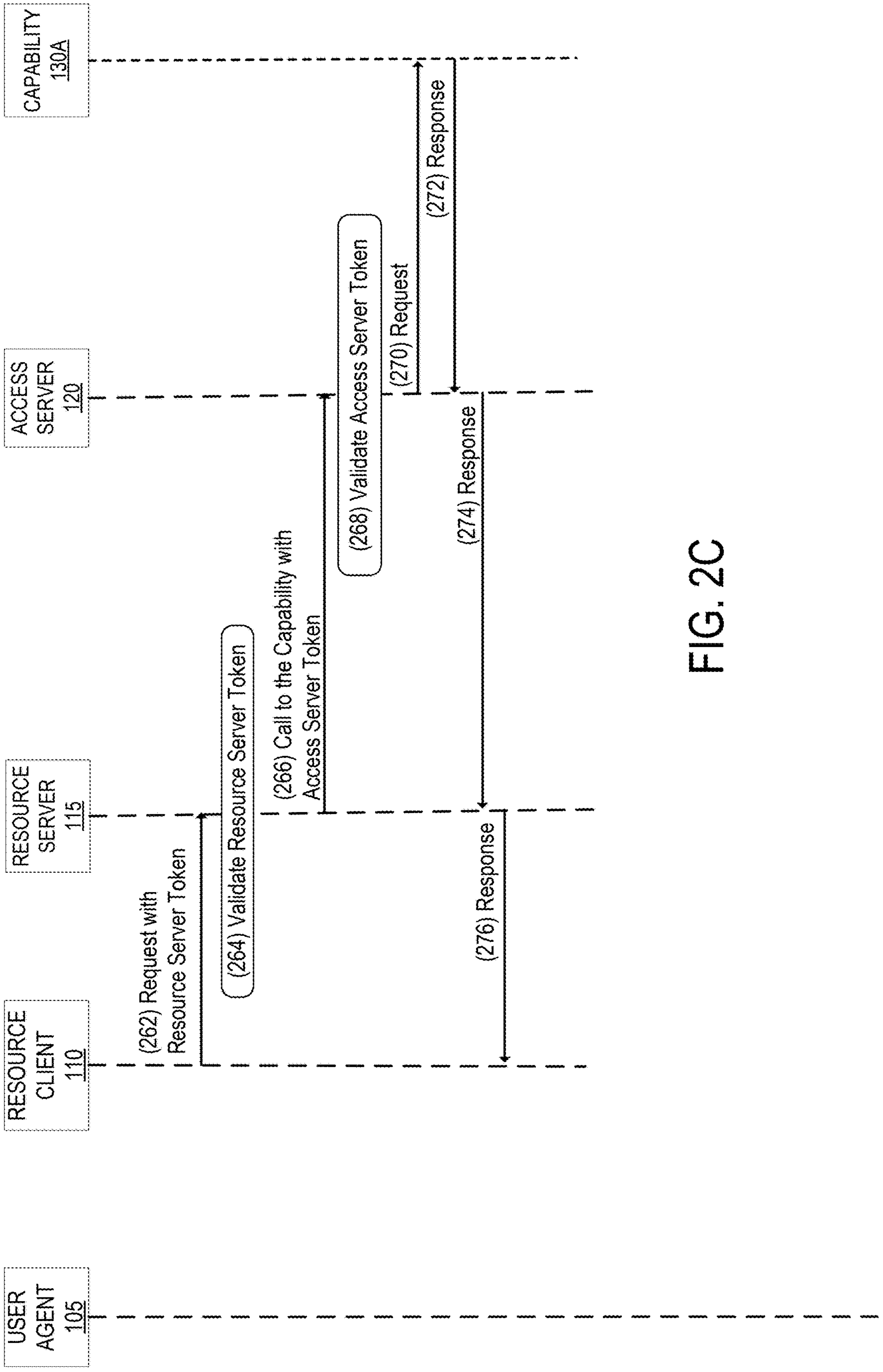
FIG. 2C is a third portion of the sequence diagram that illustrates exemplary operations for controlling access to one or more external capabilities exposed by a resource server for artificial intelligence models according to an embodiment.

FIG. 2A is a first portion of a sequence diagram that illustrates exemplary operations for controlling access to one or more external capabilities exposed by a resource server for AI model(s) according to an embodiment. FIG. 2B is a second portion of the sequence diagram that illustrates exemplary operations for controlling access to one or more external capabilities exposed by a resource server for AI model(s) according to an embodiment. FIG. 2C is a third portion of the sequence diagram that illustrates exemplary operations for controlling access to one or more external capabilities exposed by a resource server for AI model(s) according to an embodiment.

At operation 210, the resource client 110 transmits a request to the resource server 115. In this example, this request is not associated with a valid access token. For instance, this request does not include an Authorization header with a valid access token. The resource client 110 may transmit this request as a result of a user agent, such as the user agent 105, causing the resource client 110 to perform an action that requires a capability from the remote resource server 115, such as the capability 130A. Alternatively, the resource client 110, if a standalone application, the user may directly interact with the resource client 110 that causes it to perform an action that requires a capability from the remote resource server 115, such as the capability 130A.

Because this request is for a protected resource and does not include any authorization, the resource server 115 responds with a response that indicates that the request is unauthorized, at operation 212. This response includes a header that includes the URL that the resource client 110 is to direct the user agent 105 to begin authentication, which is referred to as the authorization URL. This response may have an HTTP 401 status code. The resource client 110 receives this response from the resource server 115.

The resource client 110 generates parameters for the authorization flow. The resource client 110 redirects the user agent 105 to submit an authorization request to the endpoint specified by the authorization URL at operation 214. In this example, the endpoint specified by the authorization URL is the resource server 115. The redirection includes a URL, sometimes called an authorization request URL, that includes the authorization URL and query parameters that are generated by the resource client. These parameters are sometimes referred to as authorization request parameters. The authorization request parameters may include a response type (e.g., a code response type that indicates that the resource client 110 is using the Authorization Code Flow mechanism), a client identifier that identifies the resource client 110, a scope that specifies the scope of the requested token (e.g., read files, send messages), a redirect URI (a callback URL) that specifies the URL where the resource server 115 will redirect the user agent back to after the user grants or denies permission, a code challenge that is a hashed version of a secret code verifier that the resource client 110 generates and stores, and a code challenge method that specifies the hashing algorithm used to create the code challenge. The user agent 105 transmits this authorization request to the resource server 115 at operation 216.

In the example shown in FIG. 2A, instead of immediately redirecting the user agent 105 to an identity provider, the resource server 115 first presents an approval screen to the user. This approval screen can indicate that the resource client 110 is requesting access and can include the permissions requested. The approval screen allows the user to approve or deny the request. If the user approves the request, then the user will be redirected to complete authentication. If the user denies, the flow will stop. Thus, at operation 218, the resource server 115 transmits an authorization page to the user agent 105. This authorization allows the user to approve or deny the request. In this example, the user approves the request. Thus, at operation 220, the user has selected approval causing the user agent 105 to transmit the approval to the resource server 115.

As described above, the resource server 115 is configured such that the access server 120 is the identity provider from the perspective of the resource server 115. Thus, at operation 221, the resource server 115 redirects the user agent 105 to the access server 120. In this example, the endpoint specified by the authorization URL is the access server 120. The user agent transmits this authorization request to the access server 120 at operation 222. This authorization request includes a client identifier that identifies the resource server 115 to the access server 120, and a redirect URI (a callback URL) that specifies the URL where the access server 120 will redirect the user agent, among other things.

Although FIG. 2A shows an example where the user is not immediately redirected to the identity provider of the resource server 115, which in this case is the access server 120, in other embodiments the user may be redirected directly to the access server 120 without the user having to provide approval or consent. In such embodiments, the user agent transmits an authorization request to the access server 120 and operations 216-221 are not performed.

In an embodiment, the access server 120 does not verify users' identity. In such an embodiment, the access server 120 redirects authorization requests to an identity provider that performs verification of the user's identity such as against a user directory. The access server 120 generates an authorization request and transmits a response that redirects the user agent 105 to submit the authorization request to the identity provider authorization endpoint, at operation 223. This response includes a header that points to the identity provider authorization endpoint, which in this example belongs to the identity provider 125. This response includes a redirect URI, which in this example is to the access server 120, that instructs the identity provider to send the user back after authentication. Although FIG. 2A illustrates a single identity provider being used, in some embodiments the user can be presented with an identity provider selection page that allows the user to select an identity provider. In such an embodiment, prior to operation 223, the access server 120 transmits an identity provider selection page to the user agent 105 that allows the user to select one of multiple identity providers. The access server 120 receives the selection and redirects the user agent 105 to the selected identity provider authorization endpoint.

The user agent 105 receives the response and transmits the authorization request to the identity provider 125. The user agent 105 and the identity provider 125 perform an authentication according to the requirements of the identity provider 125 at operation 224. For instance, the user of the user agent 105 may provide credentials (e.g., username/password) and may be required to perform multifactor authentication. In the example of FIG. 2A, the user successfully authenticates to the identity provider 125. As a result, the identity provider 125 generates and transmits a response to the user agent 105 that redirects the user agent 105 to submit an authorization code to the access server 120, at operation 226. The user agent 105 receives this response and transmits the authorization code to the access server 120 at operation 228.

The access server 120 receives the authorization code from the user agent 105 and exchanges the authorization code for one or more tokens from the identity provider 125, at operation 230. The access server transmits a request to the identity provider 125 that includes the authorization code. The identity provider 125 receives this request and validates the authorization code. Assuming the authorization code is valid, the identity provider 125 returns one or more tokens (e.g., OAuth tokens) to the access server 120 at operation 232. The one or more tokens may include an access token and an identity token. The one or more tokens may also include a refresh token. The access token received from the identity provider is sometimes referred herein as an IdP access token. The identity token includes information about the user such as an email address and name.

At operation 234, the access server 120 validates the token(s) received from the identity provider 125 and enforces one or more access policies. Validating a token may include verifying the signature on the token, verifying that the token is not expired, verifying that the issued at is not in the future and optionally verify a maximum age of the token, verify that the token has not been revoked, and/or verify that the aud tag in the token matches the expected value for the given request.

Enforcing the one or more access policies may include enforcing an access policy that is defined for the resource server 115 and/or an access policy for the one or more capabilities 130A-N, such as the capability 130A, that are available to the resource server 115. The access server 120 determines the set of capabilities that are available to the resource server 115. In an embodiment, the set of capabilities that are available to the resource server 115 are configured by the customer.

Each access policy includes one or more rules to be evaluated. The one or more rules can be identity-based and/or non-identity based. An identity-based access rule is based on the identity information provided by the identity provider 125 (e.g., username, email address, etc.). For instance, an identity-based access rule may define email addresses or groups of email addresses (e.g., all emails ending in @example.com) that are allowed and/or not allowed. A non-identity based access rule is a rule that is not based on identity. Examples include rules based on location (e.g., geographic region such as the country of origin), device posture, time of request, type of request, IP address, multifactor authentication status, multifactor authentication type, type of device, type of user agent, whether the request is associated with an access agent on the client device, and/or other layer 3, layer 4, and/or layer 7 policies.

To determine device posture, for example, the access server 120 may access one or more endpoint protection provider(s) (EPP(s)) to determine the posture of the client device 102. The EPP(s) determine the posture of the client device 102, which can include information such as patch status, management status, vulnerability score, etc. For instance, the EPP can determine if the client device is a healthy device and/or managed correctly as determined by configuration set at the EPP. The EPP(s) transmit a device posture response to the access server 120. The response may indicate whether the client device 102 satisfies their requirements or rules (e.g., whether the client device 102 is healthy and/or compliant). An EPP may be a remote server or in some cases may be an agent that is executing on the client device 102.

The resource server 115 and an available capability such as the capability 130A can be associated with different access policies with different rules. Thus, it is possible for a request to satisfy an access policy associated with the resource server 115 and violate an access policy associated with an available capability. Likewise, it is possible for a request to violate an access policy associated with the resource server 115 and satisfy an access policy associated with an available capability. If the request is not allowed because of the access policy associated with the resource server 115, the request will be denied regardless of whether the request satisfies an access policy associated with the capability. In the example shown in FIG. 2A, the request satisfies an access policy associated with the resource server 115.

As part of enforcing the access policies, the access server 120 determines the subset of the set of capabilities available to the resource server 115 that the request is permitted to access based on the access policy(ies). In the example of FIG. 2A, the request is permitted to access at least one capability that is available to the resource server 115, the capability 130A. The access server 120 determines whether there has been consent to allow the resource server 115 to access the subset of the set of capabilities. The consent may be provided by the user (identified in the identity token) in a previous interaction or by an administrator of the user. If consent has not been provided, the access server 120 transmits a consent page to the user agent 105 in operation 238. This consent page indicates the set of capabilities that the resource server 115 can access on behalf of the user and allows the user to select which set of capabilities to allow access. The user can select zero or more of the set of capabilities. In operation 240, the user agent 105 transmits the selection of capabilities and consent to the access server 120. In the example of FIG. 2, the user has provided consent for the resource server 115 to access the capability 130A on behalf of the user. If consent has been previously provided, then operations 238 and 240 are not performed.

Assuming that consent has been granted for the resource server 115 to access the capability 130A on behalf of the user, at operation 242, the access server 120 transmits a response to the user agent 105 that redirects the user agent 105 to submit an authorization code to the resource server 115, at operation 242. The user agent 105 receives this response and transmits the authorization code to the resource server 115 at operation 244. The resource server 115 receives the authorization code from the user agent 105 and transmits the authorization code to the access server 120 to exchange it for one or more tokens from the access server 120, at operation 246.

The access server 120 generates one or more tokens at operation 248. For example, the access server 120 generates an access token. The access server 120 may also generate an identity token. This access token is sometimes referred herein as an access server access token. The identity token is sometimes referred herein as an access server identity token. The access server access token is different from the IdP access token, and the access server identity token is different from the IdP identity token. The access server access token identifies each capability that the resource server 115 is allowed access on behalf of the user and consent has been provided. This allows the token to be used for access for those specific capabilities. For example, the access token may be a JSON Web Token (JWT) that includes an audience claim that identifies each such capability in the resource capability access service. The access server identity token includes information about the user such as name and email address. The access server access token is signed by the access server 120 and the access server identity token is signed by the access server 120. The access server 120 returns the access server token(s) to the resource server 115 at operation 250. These token(s) include the access server access token and optionally the identifier token.

The resource server 115 receives the token(s) from the access server 120 and validates the token(s). Validating a token may include verifying the signature on the token. If the access server access token is valid, the resource server 115 may generate its own access token (e.g., an OAuth token) that is scoped to the resource client 110 at operation 252. This access token is sometimes referred herein as a resource server access token. The resource server access token is different from the access server access token and the IdP access token. The resource server access token may be bound or mapped to the access server access token. Instead of generating its own access token, the resource server 115 may instead reuse the access token received from the access server 120 (the access server access token). The resource server 115 transmits a response to the user agent 105 that redirects the user agent 105 to submit an authorization code to the resource client 110 at operation 254. The user agent 105 receives this response and transmits the authorization code to the resource client 110 at operation 256. The resource client 110 receives the authorization code from the user agent 105 and exchanges the authorization code for the resource server access token from the resource server 115, at operation 258 (or for the access server access token if it is being reused). The resource server 115 returns the resource server access token, or the access server access token if reused, to the resource client 110 at operation 260.

The resource client 110 receives the access token from the resource server 115, either the resource server access token or the access server access token. This token allows the resource client to make secure API calls that require access to a capability protected by the access server 120, such as the capability 130A. The resource client 110 makes a request to the resource server 115 that includes the access token, which can be in an authorization header of the request, at operation 262. This request requires access to a capability protected by the access server 120, which is the capability 130A.

The resource server 115 receives the request including the access token. The resource server 115 validates the access token at operation 264. For instance, the resource server 115 may verify the signature of the access token, verify that the access token has not expired, and verify that the access token is not revoked. Assuming the access token is valid, the resource server 115 makes a call to the access server 120 for a protected resource, which in this case is the capability 130, at operation 266. This request includes the access server access token. The access server 120 validates the access server access token at operation 268 including verifying the signature of the access server access token. Validating the access server access token may also include verifying that the token is not expired, verifying that the issued at is not in the future and optionally verify a maximum age of the token, verify that the token has not been revoked, and/or verify that the aud tag in the token matches the expected value for the given request. If the access server access token is valid, the access server 120 transmits the request to the capability 130A at operation 270. The access server 120 may also transmit a token to the capability 130A that includes the claim and user information (e.g., identity information). The capability 130A processes the request, may validate the token, and transmits a response to the access server 120 at operation 272. The access server 120 transmits the response to the resource server 115 at operation 274. The resource server 115 in turn transmits the response to the resource client 110 at operation 276. The resource client 110 may return the response to the user agent 105 if the user agent 105 is the originator of the request.

In an embodiment, prior to sending the request to the capability 130A in operation 270, the access server can enforce an access policy to determine that the request satisfies the rules of the access policy.

In the example of FIGS. 2A-2C, the authorization method used is the Proof Key for Code Exchange (PKCE). In other embodiments, a different authorization method may be used such as the implicit flow. In the implicit flow, there is no authorization code and no token exchange operations. Instead, the access token is returned without any extra authorization code exchange operation.

In the example of FIG. 2A, a particular authorization flow is used to obtain an identity token from the IDP 125 (e.g., operations 226-232). However, alternative methods exist for retrieving user identity data.

For example, instead of interacting with a third-party identity provider such as the identity provider 125, the access server 120 may cause a one-time pin (OTP) to be transmitted to the user agent 105 to retrieve identity data of the user. For instance, the access server 120 may present a login page to the user agent 105 that allows an email address to be entered to receive a login code (an OTP). If the email address is allowed by the access policy(ies) associated with the resource server 115, an email with the login code (the PIN) will be sent to the email address. If the user submits the PIN to the login page to the user agent 105, and the access server 120 verifies that the code is valid, the remaining flow may continue (e.g., the access policy(ies) associated with the resource server 115 are enforced like in operation 234, followed by the operations detailed in FIG. 2B).

In the example of FIG. 2A, an authorization framework like OAuth is used. In other examples, a different authorization framework is used so that a user can grant a third party the capability to perform actions on their behalf. For example, a Security Assertion Markup Language (SAML) authorization framework can be used. In a SAML authorization framework, SAML assertions may be used instead of tokens from the identity provider.

Figure 3:
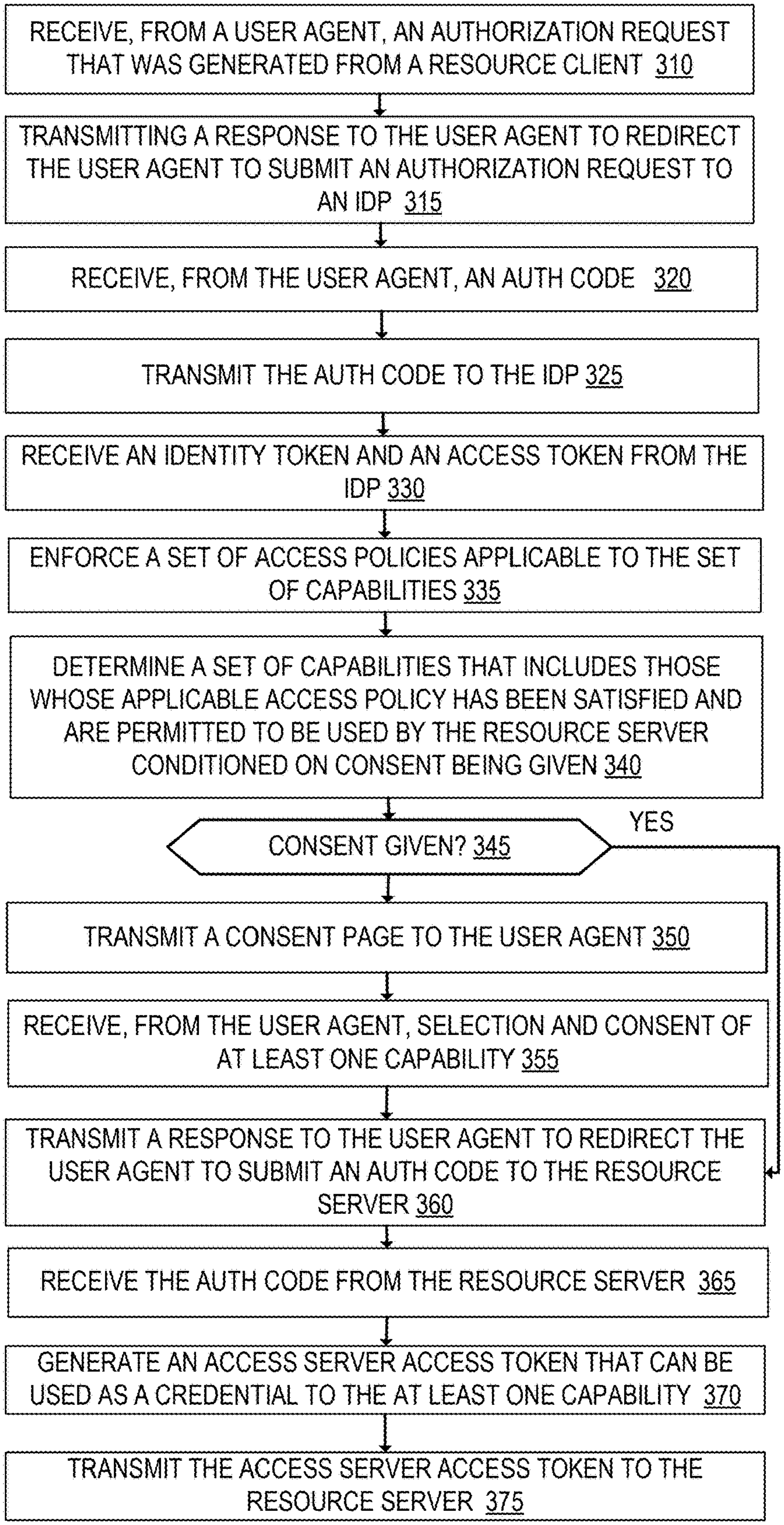
FIG. 3 is a flow diagram that illustrates exemplary operations for generating an access token for enforcing access control for external capabilities exposed by a resource server for artificial intelligence models according to an embodiment.

FIG. 3 is a flow diagram that illustrates exemplary operations for generating an access token for enforcing access control for external capabilities exposed by a resource server for artificial intelligence models according to an embodiment. At operation 310, the access server 120 receives, from a user agent 105, an authorization request that was generated by a resource client 110. The authorization request is requesting authorization of a resource server 115. The access server 120 may receive this authorization request because it has been configured as an identity provider from the perspective of the resource server 115. The authorization request may include a response type, a client identifier that identifies the resource client 110, a scope that specifies the scope of the requested token, a redirect URI (a callback URL) that specifies the URL where the resource server 115 will redirect the user agent 105 back to after the user grants or denies permission, a code challenge that is a hashed version of a secret code verifier that the resource client 110 generates and stores, and a code challenge method that specifies the hashing algorithm used to create the code challenge.

In the example of FIG. 3, the access server 120 does not verify users' identity against a user directory even though it has been configured as an identity provider from the perspective of the resource server 115. Instead, the access server 120 is integrated with an identity provider such as the identity provider 125. At operation 315, the access server 120 transmits a response to the user agent 105 that redirects the user agent 105 to transmit an authorization request to an identity provider, such as the identity provider 125. This authorization request may include a response type, a client identifier that identifies the resource server 115, a redirect URI (a callback URL) that specifies the URL where the identity provider 125 will redirect the user agent 105 back after authentication (which in this case is the access server 120), a code challenge that is a hashed version of a secret code verifier that, and a code challenge method that specifies the hashing algorithm used to create the code challenge.

The user agent 105 and the identity provider 125 will perform an authentication according to the requirements of the identity provider 125. For instance, the user of the user agent 105 may provide credentials (e.g., username/password) and may be required to perform multifactor authentication. After successfully authenticating, the identity provider 125 will redirect the user agent 105 back to the access server 120 to submit an authorization code.

At operation 320, the access server 120 receives an authorization code from the user agent 105. The access server 120 exchanges the authorization code for token(s) from the identity provider 125. At operation 325, the access server 120 transmits the authorization code to the identity provider 125. The identity provider 125 will return an access token (an IdP access token) and an identity token. Thus, at operation 330, the access server 120 receives an access token (an IdP access token) and an identity token from the identity provider 125. The access server 120 may also receive a refresh token from the identity provider 125.

The access server 120 validates the token(s) received from the identity provider 125 and enforces a set of or more access policies that are applicable to the resource server 115 and/or the set of capabilities 130A-N at operation 335. The resource server 115 is associated with a set of one or more capabilities 130A-N, which may be configured by the customer. The resource server 115 will not expose capabilities that the user is not permitted to use as determined by the set of one or more access policies. For instance, the access server 120 will enforce the rules of the access policy(ies) associated with the resource server 115, if any, and enforce the rules of the access policy(ies) associated with each associated capability 130A-N, if any. The rules can be identity-based and/or non-identity based, and configured by the customer. If the access policy(ies) associated with the resource server 115 are not satisfied, the user will not be permitted to use any of the capabilities associated with the resource server 115. If the user satisfies the access policy(ies) associated with the resource server 115 and satisfies the access policy(ies) associated with a particular associated capability 130A-N, that capability is eligible to be executed by the resource server on behalf of the user, conditioned on consent being given. If the user satisfies the access policy(ies) associated with the resource server 115 and does not satisfy the access policy(ies) associated with a particular associated capability 130A-N, that capability is not eligible to be executed by the resource server on behalf of the user.

Although FIG. 3 shows an embodiment where the access server 120 is integrated with an identity provider such as the identity provider 125 to retrieve identity, in another embodiment the access server 120 retrieves identity in other ways. For instance, the access server 120 may present a login page to the user agent 105 that allows an email address to be entered to receive a login code (an OTP). If the email address is allowed by the access policy(ies) associated with the resource server 115, an email with the login code (the PIN) will be sent to the email address. If the user submits the PIN to the login page to the user agent 105, and the access server 120 verifies that the code is valid, and if valid, can enforce the set of one or more access policies at operation 335.

At operation 340, the access server 120 determines a subset of the associated capabilities that includes those of the set of associated capabilities whose applicable access policy has been satisfied. This subset of capabilities, which may be all the associated capabilities depending on the result of the access policy enforcement, are permitted to be executed by the resource server conditioned on consent being given. The consent may be provided by the user or by an administrator of the user that can apply to the entire organization. The access server 120 determines if consent has been given for each capability of the subset of the associated capabilities at operation 345. If consent has been given for each capability of the subset of the associated capabilities, then operation 360 is performed. If consent has not been given for at least one capability, the access server 120 transmits a consent page to the user agent 105 at operation 350. The consent page indicates those capability(ies) of the subset of the associated capabilities that consent has not been given. This consent page allows the user to select which one or more capabilities to allow access. The user can select zero or more of the capability(ies) and provide their selection. At operation 355, the access server 120 receives, from the user agent 105, selection and consent of at least one capability.

At operation 360, the access server 120 transmits a response to the user agent 105 to redirect the user agent 105 to submit an authorization code to the resource server 115. The user agent 105 receives this response and transmits the authorization code to the resource server. The resource server exchanges the authorization code for a token from the access server 120. Thus, at operation 365, the access server 120 receives the authorization code from the resource server 115.

Next, at operation 370, the access server 120 generates an access token (the access server access token). The access server access token identifies each capability that the resource server 115 is allowed access on behalf of the user and consent has been provided. The access server access token is capable of being used as a credential for access for those specific capabilities. For example, the access token may be a JWT that includes an audience claim that identifies each such capability in the resource capability access service. The access server access token is signed by the access server 120.

The access server 120 returns the access server access token to the resource server 115 at operation 375. The access server 120 may also transmit the identity token to the resource server 115. The resource server 115 receives the token(s) from the access server 120 and validates the token(s). Validating a token may include verifying the signature on the token. If the access server access token is valid, the resource server 115 may generate its own access token (the resource server access token) that is scoped to the resource client 110. The resource server access token may be bound or mapped to the access server access token. The resource server 115 transmits the resource server access token to the resource client 110 as part of a PKCE authorization flow.

In the example of FIG. 3, an authorization framework like OAuth is used. In other examples, a different authorization framework is used so that a user can grant a third party the capability to perform actions on their behalf. For example, a Security Assertion Markup Language (SAML) authorization framework can be used. In a SAML authorization framework, SAML assertions may be used instead of tokens from the identity provider.

Figure 4:
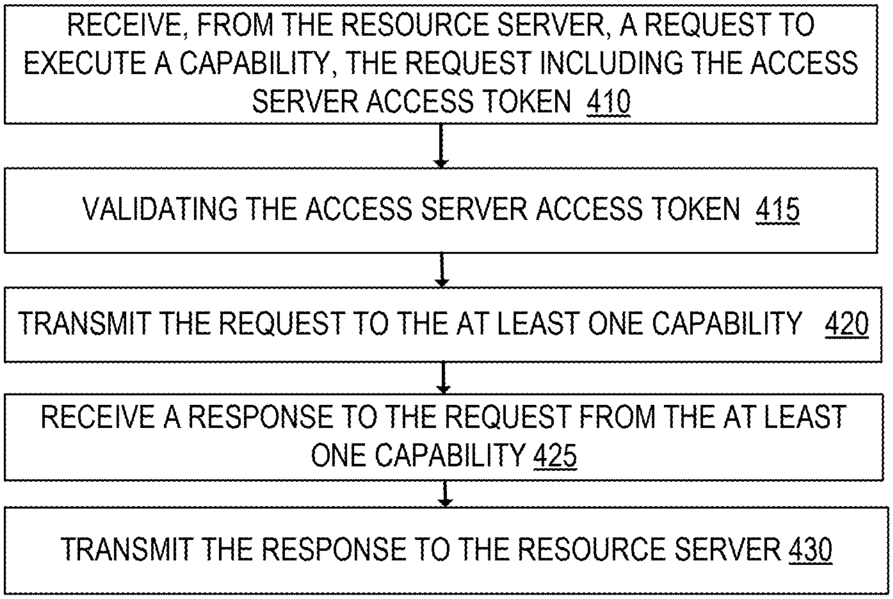
FIG. 4 is a flow diagram that illustrates exemplary operations for enforcing access control to one or more external capabilities exposed by a resource server for artificial intelligence models according to an embodiment.

FIG. 4 is a flow diagram that illustrates exemplary operations for enforcing access control to one or more external capabilities exposed by a resource server for artificial intelligence models according to an embodiment. At operation 410, the access server 120 receives, from the resource server 115, a request to execute a capability such as the capability 130A. The request includes an access token (an access server access token), which can be in an authorization header of the request. This request may be sent as a result of a user agent causing the resource client 110 to perform an action that requires a capability from the resource server 115.

Next, at operation 415, the access server 120 validates the access server access token included in the request. Validating this token includes verifying the signature of the token, verifying that the token is not expired, verifying that the issued at is not in the future and optionally verify a maximum age of the token, verify that the token has not been revoked, and/or verify that the aud tag in the token matches the expected value for the given request. If the token is not valid, the access server 120 will not execute the request. If the token is valid, the access server 120 transmits the request to the capability. FIG. 4 assumes that the token is valid. Thus, at operation 420, the access server 120 transmits the request to the capability. The capability executes the request and transmits a response to the access server 120. At operation 425, the access server 120 receives a response to the request from the capability. The access server 120 transmits the response to the resource server 115 at operation 430. The resource server 115 in turn transmits the response to the resource client 110. The resource client 110 may return the response to the user agent 105 if the user agent 105 is the originator of the request.

Embodiments have been described where the resource server 115 is configured to use a particular identity provider such as the identity provider 125. It is possible that the resource server 115 is configured to use a first identity provider and a capability, like the capability 130A, to use a second, different, identity provider. The system can be operated in different ways in this case. For instance, in one way, the user may be redirected to the first identity provider to provide identity and redirected to the second identity provider to provide identity. In another way, the user is only redirected to the first identity provider and not redirected to the second identity provider. In another way, the user will not be authorized to use the capability and thus use will be blocked for the user.

Figure 5:
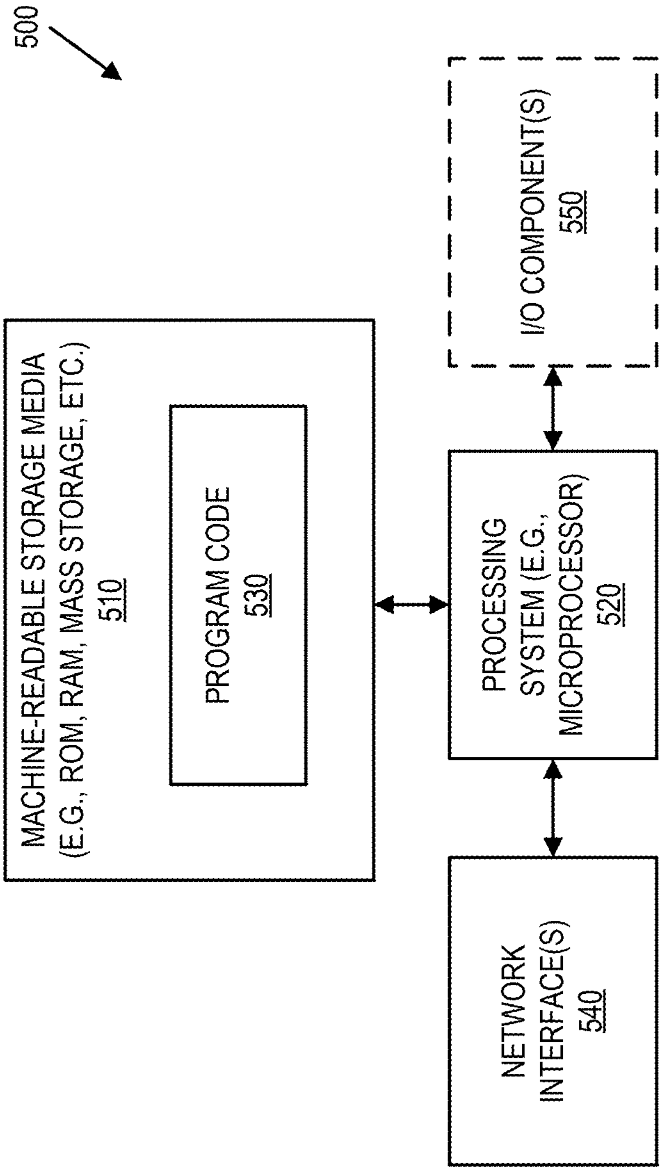
FIG. 5 is a block diagram illustrating a data processing system that can be used in an embodiment.

FIG. 5 illustrates a block diagram for an exemplary data processing system 500 that may be used in some embodiments. One or more such data processing systems 500 may be utilized to implement the embodiments and operations described with respect to the servers that implement the resource client 110, the resource server 115, and/or the access server 120. Data processing system 500 includes a processing system 520 (e.g., one or more processors and connected system components such as multiple connected chips).

The data processing system 500 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 510 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 520. For example, the depicted machine-readable storage media 510 may store program code 530 that, when executed by the processing system 520, causes the data processing system 500 to execute the resource client 110, the resource server 115, the access server 120, and/or any of the operations described herein.

The data processing system 500 also includes one or more network interfaces 540 (e.g., a wired and/or wireless interfaces) that allows the data processing system 500 to transmit data and receive data from other computing devices, typically across one or more networks (e.g., Local Area Networks (LANs), the Internet, etc.). The data processing system 500 may also include one or more input or output ("I/O") components 550. Additional components, not shown, may also be part of the system 500, and, in certain embodiments, fewer components than that shown in One or more buses may be used to interconnect the various components shown in FIG. 5.

The techniques shown in the figures can be implemented using code and data stored and executed on one or more electronic devices (e.g., a client device, a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth to provide a more thorough understanding. It will be appreciated, however, by one skilled in the art that embodiments may be practiced without such specific details. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in an access server, comprising:

receiving, from a user agent, a first authorization request that was generated by a resource client, the first authorization request requesting authorization of a resource server;

transmitting a first response to the user agent to redirect the user agent to submit a second authorization request to an identity provider;

receiving, from the user agent, a first authorization code to exchange for an identity token and an identity provider access token;

transmitting the first authorization code to the identity provider;

receiving the identity token and the identity provider access token from the identity provider;

determining a first set of one or more capabilities that are associated with the resource server;

enforcing a set of one or more access policies that are applicable to the first set of one or more capabilities respectively;

determining a second set of one or more capabilities, wherein the second set of capabilities includes those of the first set of one or more capabilities whose applicable access policy has been satisfied and are permitted to be used by the resource server conditioned on consent being given;

identifying a third set of one or more capabilities of the second set of capabilities for which consent has been provided by a user identified in the identity token or an administrator of the user;

transmitting a second response to the user agent to redirect the user agent to submit a second authorization code to the resource server;

receiving, from the resource server, the second authorization code;

generating an access server access token, wherein the access server access token is different from the identity provider access token, and wherein the access server access token is capable of being used as a credential to the third set of capabilities;

transmitting the access server access token to the resource server;

receiving, from the resource server, a first request to use one of the third set of capabilities, wherein the first request includes the access server access token;

validating the access server access token in the first request;

transmitting a second request that is based on the first request to the one of the third set of capabilities;

receiving a third response to the second request from the one of the third set of capabilities; and transmitting the third response to the resource server.

2. The method of claim 1, wherein the set of one or more access policies includes one or more identity-based rules and/or non-identity based rules.

3. The method of claim 1, further comprising:

receiving, from the resource server, a third request to use one of the third set of capabilities;

determining that the third request does not include a valid token to access the one of the third set of capabilities; and blocking the third request.

4. The method of claim 1, wherein the access server access token is an OAuth token, and wherein the access server access token identifies each of the third set of capabilities in an audience claim.

5. The method of claim 1, further comprising:

prior to transmitting the second request to the one of the third set of capabilities, enforcing an access policy that is applicable to the one of the third set of capabilities to determine that the first request meets requirements to access the one of the third set of capabilities.

6. The method of claim 1, wherein the resource server is a Model Context Protocol (MCP) server, and wherein the resource client is an MCP client.

7. The method of claim 1, wherein validating the access server access token includes verifying a signature of the access server access token, verifying that the access server access token is not expired, and verifying that the access server access token has not been revoked.

8. A non-transitory machine-readable storage medium that provides instructions that, if executed by a processor of an access server, will cause the access server to perform operations comprising:

receiving, from a user agent, a first authorization request that was generated by a resource client, the first authorization request requesting authorization of a resource server;

transmitting a first response to the user agent to redirect the user agent to submit a second authorization request to an identity provider;

receiving, from the user agent, a first authorization code to exchange for an identity token and an identity provider access token;

transmitting the first authorization code to the identity provider;

receiving the identity token and the identity provider access token from the identity provider;

determining a first set of one or more capabilities that are associated with the resource server;

enforcing a set of one or more access policies that are applicable to the first set of one or more capabilities respectively;

determining a second set of one or more capabilities, wherein the second set of capabilities includes those of the first set of one or more capabilities whose applicable access policy has been satisfied and are permitted to be used by the resource server conditioned on consent being given;

identifying a third set of one or more capabilities of the second set of capabilities for which consent has been provided by a user identified in the identity token or an administrator of the user;

transmitting a second response to the user agent to redirect the user agent to submit a second authorization code to the resource server;

receiving, from the resource server, the second authorization code;

generating an access server access token, wherein the access server access token is different from the identity provider access token, and wherein the access server access token is capable of being used as a credential to the third set of capabilities;

transmitting the access server access token to the resource server;

receiving, from the resource server, a first request to use one of the third set of capabilities, wherein the first request includes the access server access token;

validating the access server access token in the first request;

transmitting a second request that is based on the first request to the one of the third set of capabilities;

receiving a third response to the second request from the one of the third set of capabilities; and transmitting the third response to the resource server.

9. The non-transitory machine-readable storage medium of claim 8, wherein the set of one or more access policies includes one or more identity-based rules and/or non-identity based rules.

10. The non-transitory machine-readable storage medium of claim 8, wherein the operations further comprise:

receiving, from the resource server, a third request to use one of the third set of capabilities;

determining that the third request does not include a valid token to access the one of the third set of capabilities; and blocking the third request.

11. The non-transitory machine-readable storage medium of claim 8, wherein the access server access token is an OAuth token, and wherein the access server access token identifies each of the third set of capabilities in an audience claim.

12. The non-transitory machine-readable storage medium of claim 8, further comprising:

prior to transmitting the second request to the one of the third set of capabilities, enforcing an access policy that is applicable to the one of the third set of capabilities to determine that the first request meets requirements to access the one of the third set of capabilities.

13. The non-transitory machine-readable storage medium of claim 8, wherein the resource server is a Model Context Protocol (MCP) server, and wherein the resource client is an MCP client.

14. The non-transitory machine-readable storage medium of claim 8, wherein validating the access server access token includes verifying a signature of the access server access token, verifying that the access server access token is not expired, and verifying that the access server access token has not been revoked.

15. An access server, comprising:

a processing system; and a non-transitory machine-readable storage medium that provides instructions that, if executed by the processing system, will cause the access server to perform operations comprising:

receiving, from a user agent, a first authorization request that was generated by a resource client, the first authorization request requesting authorization of a resource server;

transmitting a first response to the user agent to redirect the user agent to submit a second authorization request to an identity provider;

receiving, from the user agent, a first authorization code to exchange for an identity token and an identity provider access token;

transmitting the first authorization code to the identity provider;

receiving the identity token and the identity provider access token from the identity provider;

determining a first set of one or more capabilities that are associated with the resource server;

enforcing a set of one or more access policies that are applicable to the first set of one or more capabilities respectively;

determining a second set of one or more capabilities, wherein the second set of capabilities includes those of the first set of one or more capabilities whose applicable access policy has been satisfied and are permitted to be used by the resource server conditioned on consent being given;

identifying a third set of one or more capabilities of the second set of capabilities for which consent has been provided by a user identified in the identity token or an administrator of the user;

transmitting a second response to the user agent to redirect the user agent to submit a second authorization code to the resource server;

receiving, from the resource server, the second authorization code;

generating an access server access token, wherein the access server access token is different from the identity provider access token, and wherein the access server access token is capable of being used as a credential to the third set of capabilities;

transmitting the access server access token to the resource server;

receiving, from the resource server, a first request to use one of the third set of capabilities, wherein the first request includes the access server access token;

validating the access server access token in the first request;

transmitting a second request that is based on the first request to the one of the third set of capabilities;

receiving a third response to the second request from the one of the third set of capabilities; and transmitting the third response to the resource server.

16. The access server of claim 15, wherein the set of one or more access policies includes one or more identity-based rules and/or non-identity based rules.

17. The access server of claim 15, wherein the operations further comprise:

receiving, from the resource server, a third request to use one of the third set of capabilities;

determining that the third request does not include a valid token to access the one of the third set of capabilities; and blocking the third request.

18. The access server of claim 15, wherein the access server access token is an OAuth token, and wherein the access server access token identifies each of the third set of capabilities in an audience claim.

19. The access server of claim 15, further comprising:

prior to transmitting the second request to the one of the third set of capabilities, enforcing an access policy that is applicable to the one of the third set of capabilities to determine that the first request meets requirements to access the one of the third set of capabilities.

20. The access server of claim 15, wherein the resource server is a Model Context Protocol (MCP) server, and wherein the resource client is an MCP client.

* * * * *